(12) United States Patent
Chou et al.

(10) Patent No.: US 9,013,542 B2
(45) Date of Patent: Apr. 21, 2015

(54) IMAGE CAPTURE DEVICE AND IMAGE SYNTHESIS METHOD THEREOF

(75) Inventors: Hong-Long Chou, Taipei (TW);
Chia-Chun Tseng, Hsinchu (TW);
Chia-Yu Wu, Hsinchu (TW)

(73) Assignee: Altek Corporation, Hsinchu (TW)

( * ) Notice: Subject to any disclaimer, the term of this patent is extended or adjusted under 35 U.S.C. 154(b) by 407 days.

(21) Appl. No.: 13/474,223

(22) Filed: May 17, 2012

(65) Prior Publication Data

US 2013/0250041 A1 Sep. 26, 2013

(30) Foreign Application Priority Data

Mar. 26, 2012 (TW) .............................. 101110352 A (51) Int. Cl.
*H04N 5/225* (2006.01)
*H04N 5/232* (2006.01)
*H04N 5/235* (2006.01)

(52) U.S. Cl.
CPC ........ *H04N 5/23238* (2013.01); *H04N 5/23212* (2013.01); *H04N 5/23232* (2013.01); *H04N 5/2356* (2013.01)

(58) Field of Classification Search
CPC . H04N 5/2356; H04N 5/23238; H04N 5/225; H04N 5/23212; H04N 5/23232
USPC .......................................................... 348/36
See application file for complete search history.

(56) References Cited

U.S. PATENT DOCUMENTS

| | | | | |
|---|---|---|---|---|
| 3,187,339 A | * | 6/1965 | Clay ................................ | 352/61 |
| 5,023,725 A | * | 6/1991 | McCutchen ..................... | 348/38 |
| 6,459,451 B2 | * | 10/2002 | Driscoll et al. ................ | 348/335 |
| 8,866,920 B2 | * | 10/2014 | Venkataraman et al. .. | 348/218.1 |
| 8,885,059 B1 | * | 11/2014 | Venkataraman et al. .. | 348/218.1 |
| 8,896,719 B1 | * | 11/2014 | Venkataraman et al. .. | 348/218.1 |
| 2002/0080261 A1 | * | 6/2002 | Kitamura et al. ............. | 348/349 |
| 2004/0027451 A1 | * | 2/2004 | Baker ............................. | 348/46 |
| 2004/0227693 A1 | * | 11/2004 | Rambo et al. .................... | 345/6 |
| 2005/0259330 A1 | * | 11/2005 | Neil ............................... | 359/676 |
| 2006/0023105 A1 | * | 2/2006 | Kostrzewski et al. ........ | 348/335 |
| 2006/0038897 A1 | * | 2/2006 | Sakimura et al. ............ | 348/231.6 |
| 2006/0227415 A1 | * | 10/2006 | Caldwell et al. .............. | 359/432 |
| 2007/0097206 A1 | * | 5/2007 | Houvener et al. .............. | 348/26 |
| 2007/0182812 A1 | * | 8/2007 | Ritchey ........................... | 348/36 |
| 2008/0239136 A1 | * | 10/2008 | Kanai et al. ................... | 348/340 |
| 2008/0298706 A1 | * | 12/2008 | Brown et al. ................. | 382/255 |
| 2011/0098083 A1 | * | 4/2011 | Lablans ..................... | 455/556.1 |
| 2011/0228975 A1 | * | 9/2011 | Hennessey et al. ........... | 382/103 |
| 2012/0105579 A1 | * | 5/2012 | Jeon et al. ....................... | 348/38 |
| 2012/0113214 A1 | * | 5/2012 | Li et al. ........................... | 348/36 |

* cited by examiner

*Primary Examiner* — Shan Elahi (74) *Attorney, Agent, or Firm* — Saliwanchik, Lloyd & Eisenschenk (57) ABSTRACT

This invention discloses an image capture device and an image synthesis method thereof. The image capture device comprises an image pickup module and a processing module. The image pickup module scans a plurality of visual angles of a scene in advance to obtain a plurality of temporary images. Each of the temporary images has a scanning focal length value. The processing module analyzes the plurality of temporary image of each of the visual angles to obtain a temporary focal length value. The processing module obtains a weighting focal length value by each temporary focal length value by using a function to control the image pickup module in order to perform a panorama image capturing process according to the weighting focal length value.

15 Claims, 5 Drawing Sheets

IMAGE CAPTURE DEVICE AND IMAGE SYNTHESIS METHOD THEREOF

CROSS-REFERENCE TO RELATED APPLICATION

This application claims the benefit under 35 U.S.C. §119 of Taiwan Patent Application No. 101110352, filed Mar. 26, 2012, which is hereby incorporated by reference in its entirety.

BACKGROUND

1. Field of the Invention

The present invention relates to an image capture device and an image synthesis method thereof, and more particularly to the image capture device and the image synthesis method that adjust the weights of the focal lengths of a plurality of visual angles of a scene.

2. Description of Related Art

As digital science and technology advance, most people would like to use image capture devices to capture and record immediate things, and the image capture device generally comes with a lens with a limited range of visual angles. If a user wants to record a large beautiful scene, the user generally cannot record the whole beautiful scene in one image. Similarly, if the user wants to record a complete scene from each visual angle indoors, the user generally fails to do so. Therefore, a panorama picture produced by combining several pictures is developed to accomplish the aforementioned needs.

During the process of taking a panorama image, some users focus and shoot a scene from each visual angle, and then combine the plurality of images taken into a panorama image. Since the focal length value of each visual angle is different, therefore the focal length of each image is inconsistent. As a result, the panorama image will have an obvious inconsistent sharpness or depth of field that causes a poor view and quality of the panorama image.

During the process of taking a panorama image, some other users base on the focal length of the first image to take a plurality of following images to assure that the focal lengths of different images in the scene are consistent, so as to avoid the occurrence of inconsistent sharpness or depth of field of the panorama image. However, if the depth of field in the scene has a large change, the depth of field for the foreground or background in the panorama image may be too blurred, or even worse, the depth of field for the foreground or background cannot be recognized.

In view of the aforementioned problems, the inventor of the present invention designed an image capture device and an image synthesis method to overcome the drawbacks of the prior art, and improved the industrial application.

BRIEF SUMMARY

In view of the aforementioned problems of the prior art, it is a primary objective of the invention to provide an image capture device and an image synthesis method thereof to overcome the problems of the prior art having an inconsistent focal length, or a too-blurred depth of field for the background or foreground when a panorama image is composed by connecting a plurality of images.

To achieve the foregoing objective, the present invention provides an image capture device comprising an image pickup module and a processing module. The image pickup module captures a plurality of temporary images from a plurality of visual angles of a scene in advance by using a plurality of scanning focal length values. The processing module obtains a temporary focal length value by weighing each of the scanning focal length values of the plurality of temporary images of each of the visual angles, and further obtains a weighting focal length value by a function to control the image pickup module to perform a panorama image capturing process according to the weighting focal length value.

The function is a summation of each products of the temporary focal length value corresponding to each of the visual angles multiplied by a ratio, which is the quantity of the plurality of temporary images corresponding to the visual angles divided by the total quantity of the plurality of temporary images corresponding to each of the visual angles. In other words, the weighting focal length value is a weighted mean of the temporary focal length values respectively corresponding to the visual angles, wherein a weighting corresponding to one visual angle is the ratio of the quantity of temporary images taken at the visual angle to the quantity of total temporary images. The function is shown below:

$$L_W = L_1 \frac{Q_1}{Q_1 + Q_2 + \ldots} + L_2 \frac{Q_2}{Q_1 + Q_2 + \ldots} + \ldots$$

or, in general $$L_W = \sum_{i=1}^{m} L_i \frac{Q_i}{Q_{tot}}$$

wherein, $L_W$ is the weighting focal length value; $L_1, L_2 \ldots$ are the temporary focal length values respectively corresponding to the visual angles; m is the number of visual angles considered for producing the panorama image; $Q_1, Q_2 \ldots Q_i$ are the quantities of temporary images respectively corresponding to the visual angle; and $Q_{tot}$ is the quantity of total temporary images.

Wherein, the temporary focal length value is the scanning focal length value of the temporary image with the best contrast or sharpness among the plurality of temporary images corresponding to the visual angle.

Wherein, the temporary focal length value is an average scanning focal length value of the plurality of temporary images corresponding to the visual angle, an average value of a maximum scanning focal length value and a minimum scanning focal length value, or a difference between the maximum scanning focal length value and the minimum scanning focal length value.

Wherein, the image capture device further comprises an image synthesis module and the processing module controls the image pickup module to perform a panorama image capturing process according to the weighting focal length value, so as to obtain a weighting image of each of the visual angles, and the image synthesis module synthesizes the weighting image of each of the visual angles to obtain a panorama image.

Wherein, the image synthesis module intercepts a vertical image at a middle section of each of the weighting images and connects the vertical imagers to synthesize the panorama image.

To achieve the foregoing objective, the present invention further provides an image synthesis method, applied in an image capture device, and the image synthesis method comprising the steps of: capturing a plurality of temporary images from a plurality of visual angles of a scene by an image pickup module in advance by using a plurality of scanning focal length values; obtaining a temporary focal length value by weighing each of the scanning focal length values of the plurality of temporary images of each of the visual angles by a processing module, and obtaining a weighting focal length value by a function to control the image pickup module to perform a panorama image capturing process according to the weighting focal length value, wherein the function is a summation of each products of the temporary focal length value corresponding to each of the visual angles multiplied by a ratio, which is the quantity of the plurality of temporary images corresponding to the visual angles divided by the total quantity of the plurality of temporary images corresponding to each of the visual angles; and controlling the image pickup module by the processing module to perform a panorama image capturing process according to the weighting focal length value.

Wherein, the temporary focal length value is the scanning focal length value of the temporary image with the best contrast or sharpness among the plurality of temporary images corresponding to the visual angle.

Wherein, the temporary focal length value is an average scanning focal length value of the plurality of temporary images corresponding to the visual angle, an average value of a maximum scanning focal length value and a minimum scanning focal length value, or a difference between the maximum scanning focal length value and the minimum scanning focal length value.

Wherein, the method further comprises the steps of: using the processing module to control the image pickup module to perform a panorama image capturing process according to the weighting focal length value, so as to obtain a weighting image of each of the visual angles; and using the image synthesis module to synthesize the weighting image of each of the visual angles to obtain a panorama image.

Wherein, the image synthesis module intercepts a vertical image at a middle section of each of the weighting images and connects the vertical imagers to synthesize the panorama image.

To achieve the foregoing objective, the present invention further provides an image capture device comprising a focal length detection module, an image pickup module and a processing module. The focal length detection module focuses a plurality of visual angles of a scene in advance to produce a plurality of scanning focal length values corresponding to each of the visual angles. The image pickup module captures an image of the scene according to the plurality of scanning focal length values corresponding to each of the visual angles, so as to obtain the plurality of temporary images corresponding to each of the visual angles. The processing module obtains a temporary focal length value by weighing each of the scanning focal length values of the plurality of temporary images of each of the visual angles, and further obtains a weighting focal length value by a function to control the image pickup module to perform a panorama image capturing process according to the weighting focal length value.

Wherein, the function is a summation of each products of the temporary focal length value corresponding to each of the visual angles multiplied by a ratio, which is the quantity of the plurality of temporary images corresponding to the visual angles divided by the total quantity of the plurality of temporary images corresponding to each of the visual angles.

Wherein, the temporary focal length value is the scanning focal length value of the temporary image with the best contrast or sharpness among the plurality of temporary images corresponding to the visual angle.

Wherein, the temporary focal length value is an average scanning focal length value of the plurality of temporary images corresponding to the visual angle, an average value of a maximum scanning focal length value and a minimum scanning focal length value, or a difference between the maximum scanning focal length value and the minimum scanning focal length value.

Wherein, the image capture device further comprises an image synthesis module, and the processing module controls the image pickup module to perform a panorama image capturing process according to the weighting focal length value, so as to obtain a weighting image of each of the visual angles, and the image synthesis module synthesizes the weighting image of each of the visual angles to obtain a panorama image.

Wherein, the image synthesis module intercepts a vertical image at a middle section of each of the weighting images and connects the vertical imagers to synthesize the panorama image.

In summation, the image capture device and the image synthesis method of the present invention have the following advantage:

The image capture device and the image synthesis method measure the focal length of the scene in advance to obtain the temporary focal length value of each visual angle in the scene, and adjust the weight to obtain a weighting focal length value, and then perform the panorama image capturing process, so as to achieve a consistent focal length of the panorama image and reduce blurred depth of field of the foreground or background effectively.

DETAILED DESCRIPTION

The technical contents and characteristics of the present invention will be apparent with the detailed description of a preferred embodiment accompanied with related drawings as follows. For simplicity, same numerals are used in the following preferred embodiment to represent respective same elements.

The image capture device of the present invention can be a digital camera, a camera phone, a Smartphone, a digital video camera, a flat PC each or any portable electronic device with a photographic function. To facilitate the illustration of the technical characteristics of the present invention, digital cameras are used for the purpose of illustrating the present invention, but it is noteworthy to point out that the invention is not limited to the digital cameras only.

Figure 1:
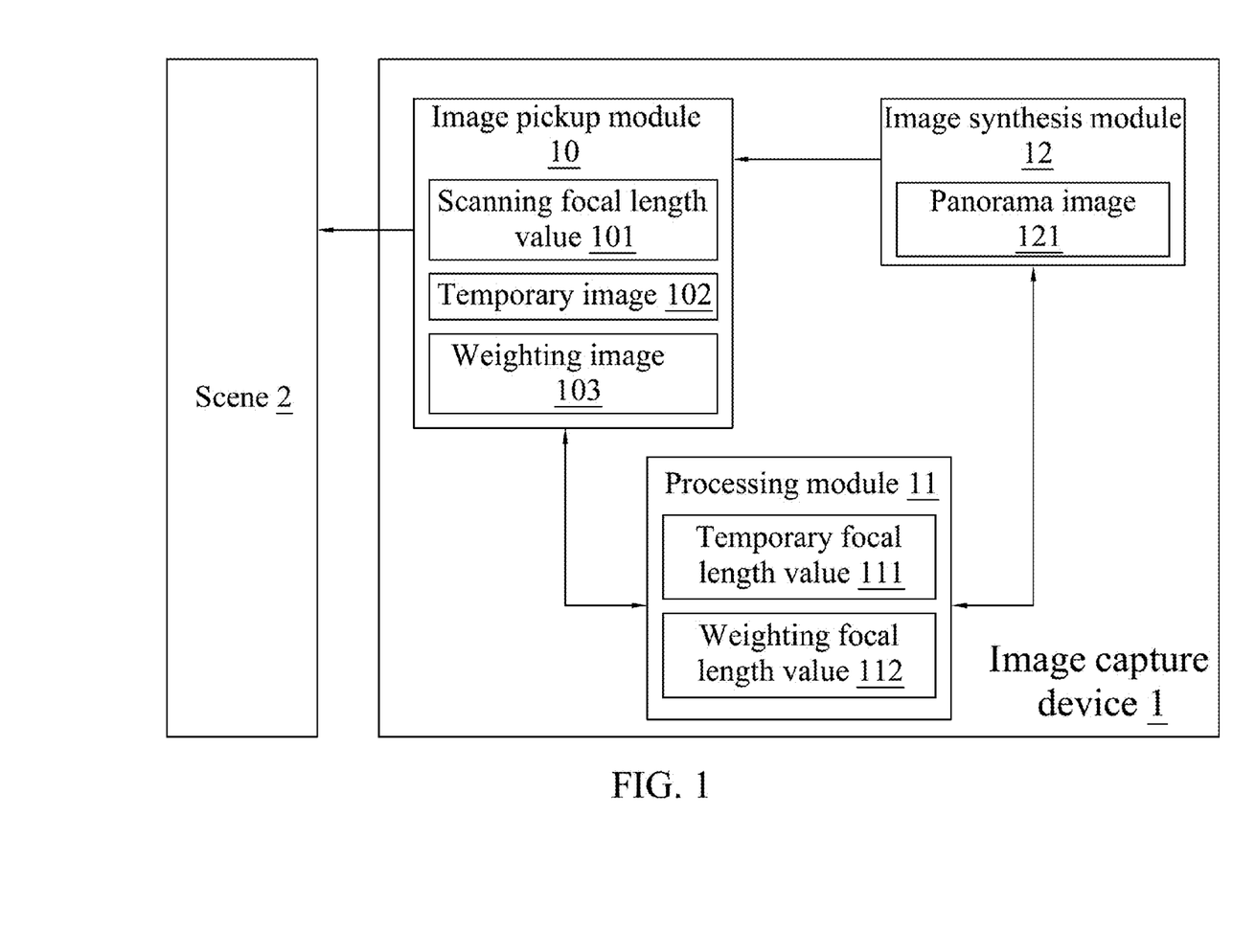
FIG. 1 is a block diagram of an image capture device in accordance with a preferred embodiment of the present invention.

With reference to FIG. 1 for a block diagram of an image capture device in accordance with a preferred embodiment of the present invention, the image capture device 1 comprises an image pickup module 10, a processing module 11 and an image synthesis module 12. The image pickup module 10 captures a plurality of temporary images 102 from a plurality of visual angles of a scene 2 by using a plurality of scanning focal length values 101 in advance. The image pickup module 10 can comprise a camera lens, a sensor such as a complementary metal oxide semiconductor (CMOS) or charge coupled device (CCD) sensor, an analog/digital circuit, or an image processor. The processing module 11 is electrically coupled to the image pickup module 10 and can be a central processing unit (CPU) or a micro-processing unit). The processing module 11 weighs each scanning focal length value 101 of the plurality of temporary images 102 of each visual angle in a scene 2 to obtain a temporary focal length value 111. And then, the processing module 11 uses a function to obtain a weighting focal length value 112 and controls the image pickup module 10 to perform a panorama image capturing process according to the weighting focal length value 112. Wherein, the function is a summation of each products of the temporary focal length value corresponding to each of the visual angles multiplied by a ratio, which is the quantity of the plurality of temporary images corresponding to the visual angles divided by the total quantity of the plurality of temporary images corresponding to each of the visual angles. The details of the function have been described above, and thus will not be repeated.

Figure 2:
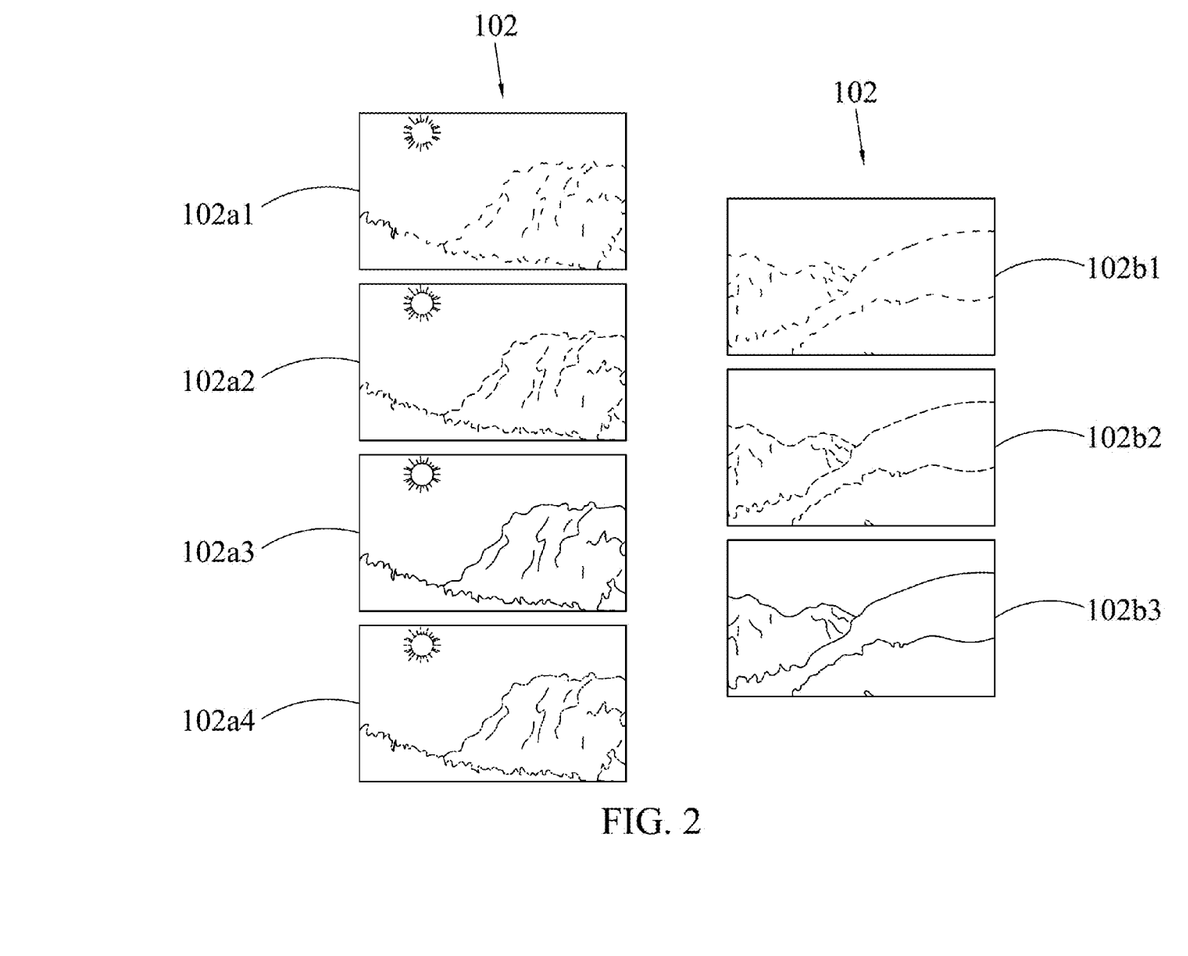
FIG. 2 is a schematic view of an image capture device in accordance with a preferred embodiment of the present invention.

With reference to FIG. 2 for a schematic view of an image capture device in accordance with a preferred embodiment of the present invention, a user uses the image capture device 1 to scan and measure the focal length of the scene 2 (such as scanning images in the scene 2 one by one from right to left or from left to right) in advance, if the user wants to take a panoramic photo. The image pickup module 10 captures a plurality of temporary images 102 from each visual angle in scene 2 by using different scanning focal length values 101. In other words, each visual angle in the scene 2 has a plurality of temporary images 102. The temporary images 102 have different scanning focal length values 101 respectively. In FIG. 2, two visual angles are used as an example for the illustration, and the plurality of temporary images 102 of one of the visual angles has a different scanning focal length value 101, so that the plurality of temporary images 102 of the visual angle are represented by 102a1, 102a2, 102a3 and 102a4 respectively. Similarly, the plurality of temporary images 102 of the other visual angle has a different scanning focal length value 101, so that the plurality of temporary images 102 of the other visual angle are represented by 102b1, 102b2 and 102b3 respectively. Now, the processing module 11 receives a plurality of temporary images 102 of each visual angle, and determines a temporary image 102 (such as 102a3 or 102b3) with the best contrast or sharpness in the plurality of temporary images 102 of each visual angle. And then, the processing module 11 selects scanning focal length value 101 with the best contrast or sharpness in the temporary image 102 (such as 102a3 or 102b3) of each visual angle as the temporary focal length value 111 of each visual angle in the scene 2, and the foregoing related parameters are substituted in the function to obtain a weighting focal length value 112.

The processing module 11 further controls the image pickup module 10 to use the weighting focal length value 112 to capture images from each visual angle in the scene 2 to obtain a weighting image 103 of each visual angle, and the processing module 11 also controls the image synthesis module 12 to synthesize the weighting image 103 of each visual angle to obtain a panorama image 121 with appropriate depth of field for the foreground or background. Wherein, the foregoing measure taken for synthesizing the images is a well-known art to persons ordinarily skilled in the art, and thus will not be described.

Figure 3:
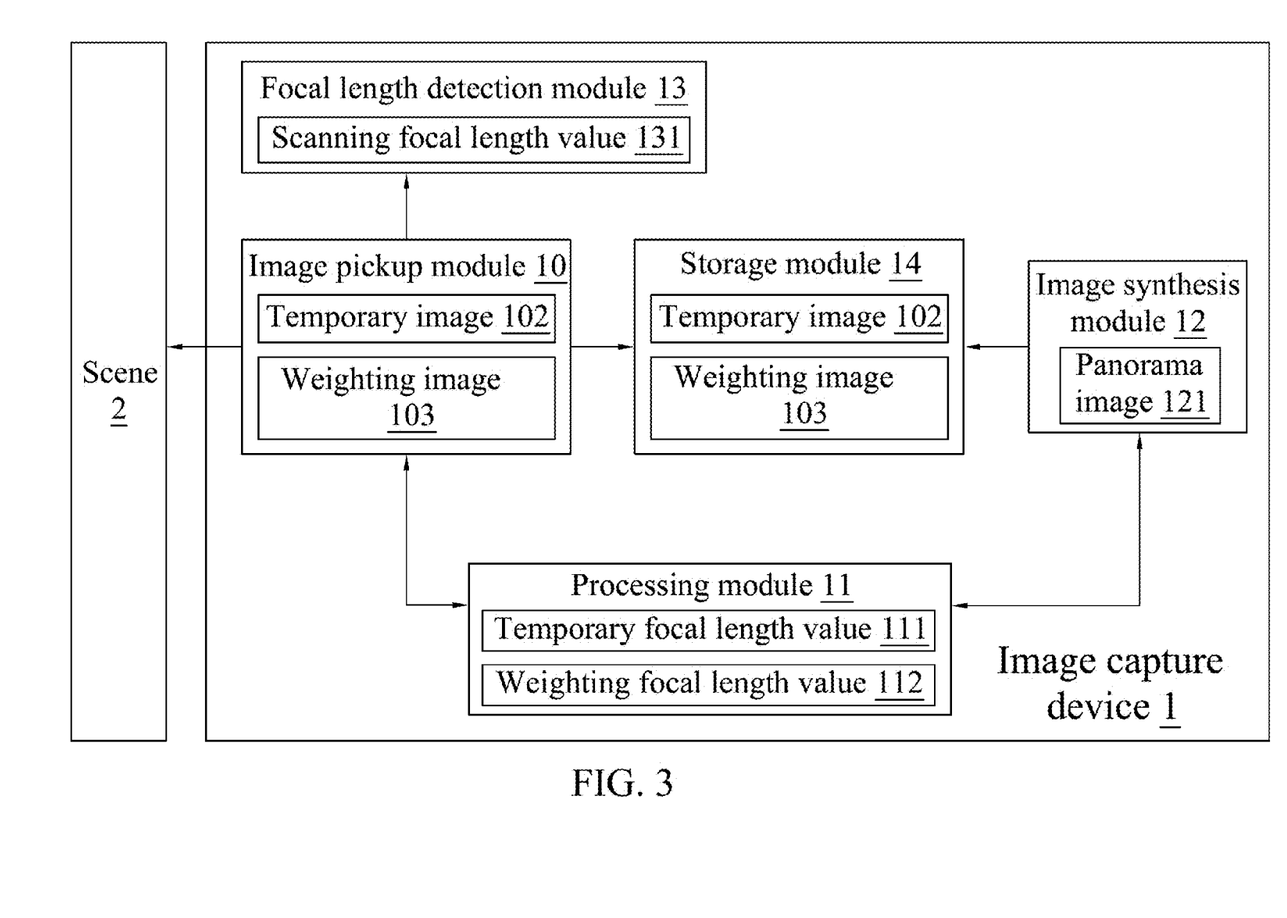
FIG. 3 is a block diagram of an image capture device in accordance with another preferred embodiment of the present invention; a flow chart of an image preview method of the present invention.
Figure 4:
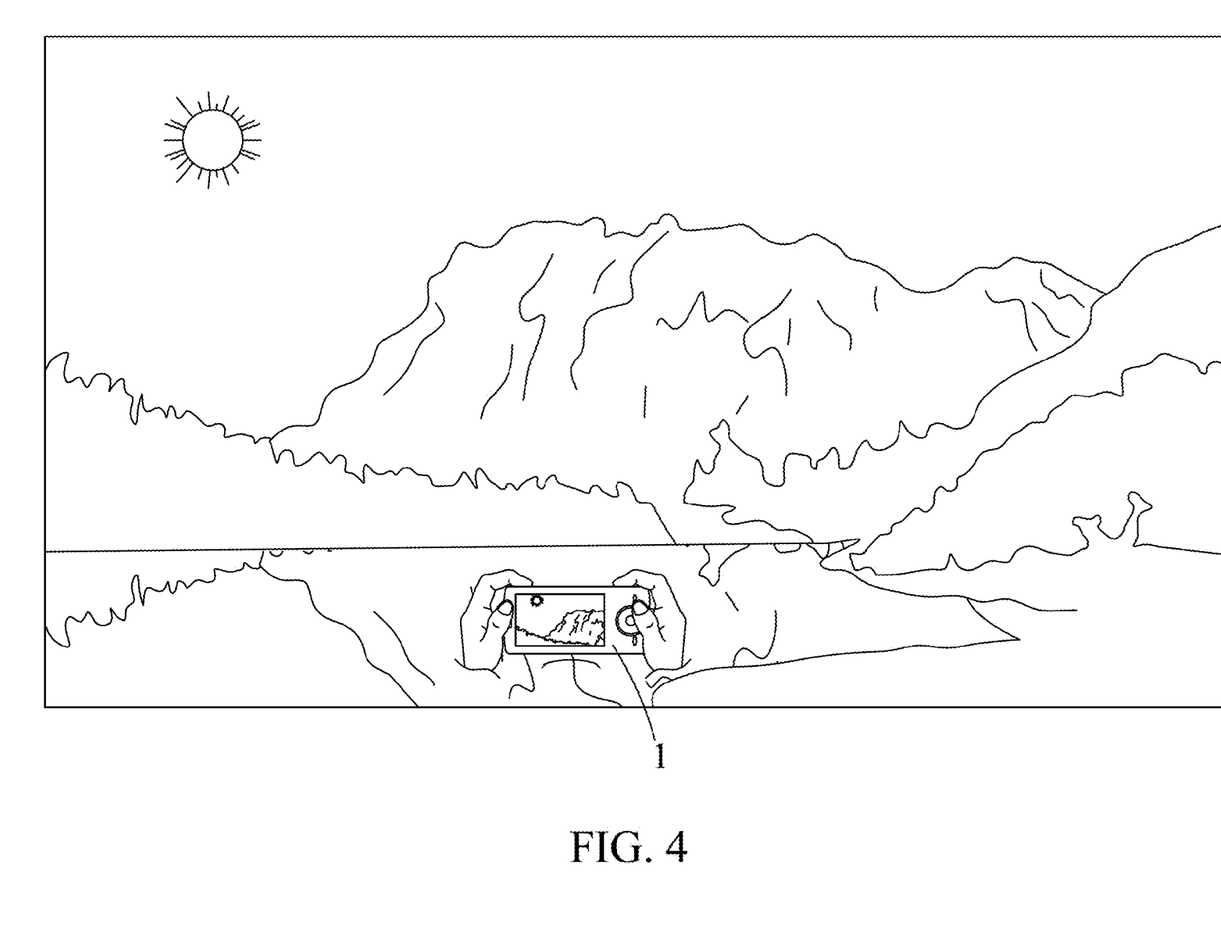
FIG. 4 is a schematic view of an image capture device in accordance with another preferred embodiment of the present invention.

With reference to FIGS. 3 and 4 for a block diagram and a schematic view of an image capture device in accordance with another preferred embodiment of the present invention respectively, this preferred embodiment is similar to the first preferred embodiment, and the similar portion will not be repeated. In the figures, the image capture device 1 comprises: an image pickup module 10, a processing module 11, an image synthesis module 12, a focal length detection module 13 and a storage module 14. In this image capture device 1, the focal length detection module 13 has an auto focus mechanism and includes an aperture for measuring a focal length in order to take a picture from each visual angle of the scene 2 to produce a plurality of scanning focal length values 131 in each visual angle, so that the image pickup module 10 can produce a plurality of temporary images 102 of each visual angle correspondingly, and temporarily store the temporary images 102 into the storage module 14. Wherein, the storage module 14 can be an embedded memory, an external memory card or their combination.

When a user uses the image capture device 1 to scan the scene 2 in advance, the user can use the focal length detection module 13 to measure the focal length of each visual angle in the scene 2 and produce a plurality of scanning focal length values 131 in each visual angle, so that the image pickup module 10 produces the temporary images 102 (such as images of a live view in the image capture device 1) of each visual angle in the scene 2 and temporarily stores the images into the storage module 14.

The processing module 11 reads a plurality of temporary images 102 of each visual angle in the storage module 14 and determines a temporary image 102 with the best contrast or sharpness in the plurality of temporary images 102 of each visual angle, and further uses the temporary image 102 with the best contrast or sharpness as a temporary focal length value 111 of each visual angle. It is noteworthy that the processing module 11 can also use an average value of the scanning focal length value of the plurality of temporary images 102 of each visual angle in the scene 2, an average value of a maximum scanning focal length value and a minimum scanning focal length value, or a difference between the maximum scanning focal length value and the minimum scanning focal length value as the temporary focal length value 111, but the invention is not limited to such arrangement only. The processing module 11 further obtains a weighting focal length value 112 from the temporary focal length value 111 of each visual angle by using a function. It is noteworthy that each visual angle in the scene 2 can be distinguished according to the range of visual angle of the camera lens of the image pickup module 10. For example, if a user presses a shutter (not shown in the figure) halfway and shifts the image capture device 1 from left to right or from right to left until the shutter is released, and the range of the visual angle of the camera lens requires only three visual angles to capture the whole of the user's desired scene 2, and the panoramic shooting of this time uses three visual angles to scan the scene 2 in advance in order to take the picture, or the visual angle is distinguished by factory setting or user-defined setting. For example, a user sets a control button (not shown in the figure) of the image capture device 1 to four times, so that if the user presses the shutter (not shown in the figure) halfway to shift the image capture device 1 from left to right or from right to left, such that an edge of a visual angle and the edge of the next visual angle are connected for three times, then panoramic shooting of this time uses four visual angles to scan the scene 2 in advance in order to take the picture.

The processing module 11 controls the image pickup module 10 to capture an image of the scene 2 according to the weighting focal length value 112, so as to obtain a weighting image 103 of each visual angle. The processing module 11 further controls the image synthesis module 12 to synthesize the weighting image 103 of each visual angle to obtain a panorama image 121, and stores the panorama image into the storage module 14 or displays the panorama image 121 by a display unit (not shown in the figure) to allow the user to view the image. It is noteworthy that when the image synthesis module 12 connects the weighting images 103, a vertical image at the middle section of each weighting image 103 can be intercepted, and connected to form a panorama image 121. This method can avoid a barrel-shaped deformation of the image caused by the wide angle of the camera lens of the image pickup module 10 and also can avoid the lines of the edges of each weighting image 103 are misaligned with one another.

Figure 5:
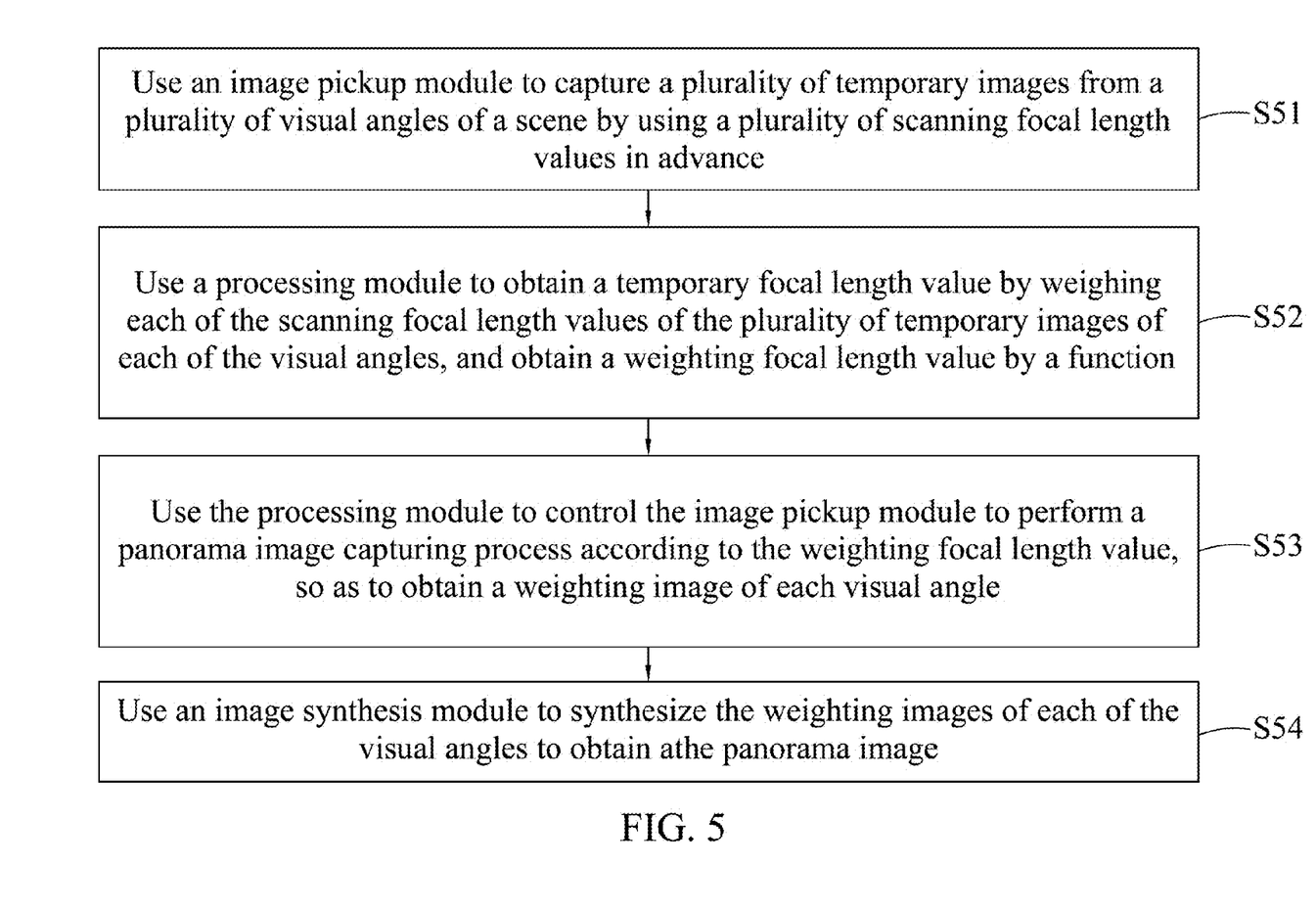
FIG. 5 is a flow chart of an image synthesis method of the present invention.

With reference to FIG. 5 for a flow chart of an image synthesis method in accordance with the present invention, the image synthesis method is applicable in an image capture device. The image capture device comprises an image pickup module and a processing module. The image synthesis method comprises the following steps:

S51: Use an image pickup module to capture a plurality of temporary images from a plurality of visual angles of a scene by using a plurality of scanning focal length values in advance.

S52: Use a processing module to obtain a temporary focal length value by weighing each of the scanning focal length values of the plurality of temporary images of each of the visual angles, and obtain a weighting focal length value by a function.

S53: Use the processing module to control the image pickup module to perform a panorama image capturing process according to the weighting focal length value, so as to obtain a weighting image of each visual angle.

S54: Use an image synthesis module to synthesize the weighting images of each of the visual angles to obtain a panorama image.

The details and implementation of the image synthesis method the image capture device of in accordance with the present invention have been described in the section of the image capture device, and thus will not be repeated.

What is claimed is:

1. An image capture device, comprising:
an image pickup unit, having a lens and sensing elements, wherein the image pickup unit captures a plurality of temporary images from a plurality of visual angles of a scene in advance based on a plurality of scanning focal length values; and
a processing circuit, connected to the image pickup unit, wherein the processing circuit obtains a temporary focal length value by weighing each of the scanning focal length values of the plurality of temporary images of each of the visual angles, and obtaining a weighting focal length value according to a function and the temporary focal length value, to control the image pickup unit to perform a panorama image capturing process according to the weighting focal length value, wherein the function is in accordance with following expression:

$$L_W = \sum_{i=1}^{m} L_i \frac{Q_i}{Q_{tot}}$$

in which $L_W$ is the weighting focal length value; $L_i$ is the temporary focal length value corresponding to each of the visual angles; m is a number of the visual angles; $Q_i$ is quantity of the temporary images corresponding to each of the visual angles; and $Q_{tot}$ is quantity of the total temporary images.

2. The image capture device of claim 1, wherein the temporary focal length value is the scanning focal length value of the temporary image with the best contrast or sharpness among the plurality of temporary images corresponding to the visual angle.

3. The image capture device of claim 1, wherein the temporary focal length value is an average scanning focal length value of the plurality of temporary images corresponding to the visual angle, an average value of a maximum scanning focal length value and a minimum scanning focal length value, or a difference between the maximum scanning focal length value and the minimum scanning focal length value.

4. The image capture device of claim 1, further comprising an image synthesis unit connected to the image pickup unit and the processing circuit, and the processing circuit controlling the image pickup unit to perform the panorama image capturing process according to the weighting focal length value to obtain a weighting image of each of the visual angles, and the image synthesis unit synthesizing the weighting image of each of the visual angles to obtain a panorama image.

5. The image capture device of claim 4, wherein the image synthesis unit intercepts a vertical image at a middle section of each of the weighting images and connects the vertical images to synthesize the panorama image.

6. An image synthesis method, applied in an image capture device, and the image synthesis method comprising the steps of:
capturing a plurality of temporary images from a plurality of visual angles of a scene by an image pickup unit in advance based on a plurality of scanning focal length values;
obtaining a temporary focal length value by weighing each of the scanning focal length values of the plurality of temporary images of each of the visual angles by a processing circuit, and obtaining a weighting focal length value according to a function that is in accordance with following expression:

$$L_W = \sum_{i=1}^{m} L_i \frac{Q_i}{Q_{tot}}$$

in which $L_W$ is the weighting focal length value; $L_i$ is the temporary focal length value corresponding to each of the visual angles; m is a number of the visual angles; $Q_i$ is quantity of temporary images corresponding to each of the visual angles; and $Q_{tot}$ is quantity of the total temporary images; and
controlling the image pickup unit by the processing circuit to perform a panorama image capturing process according to the weighting focal length value.

7. The image synthesis method of claim 6, wherein the temporary focal length value is the scanning focal length value of the temporary image with the best contrast or sharpness among the plurality of temporary images corresponding to the visual angle.

8. The image synthesis method of claim 6, wherein the temporary focal length value is an average scanning focal length value of the plurality of temporary images corresponding to the visual angle, an average value of a maximum scanning focal length value and a minimum scanning focal length value, or a difference between the maximum scanning focal length value and the minimum scanning focal length value.

9. The image synthesis method of claim 6, further comprising the steps of:
controlling, by the processing circuit, the image pickup unit to perform the panorama image capturing process according to the weighting focal length value to obtain a weighting image of each of the visual angles; and
synthesizing, by the image synthesis unit, the weighting image of each of the visual angles to obtain a panorama image.

10. The image synthesis method of claim 9, wherein the image synthesis unit intercepts a vertical image at a middle section of each of the weighting images and connects the vertical images to synthesize the panorama image.

11. An image capture device, comprising:
a focal length detection unit, wherein the focal length detection unit focuses a plurality of visual angles of a scene in advance to produce a plurality of scanning focal length values corresponding to each of the visual angles;
an image pickup unit, having a lens and sensing elements and connected to the focal length unit, wherein the image pickup unit captures an image of the scene according to the plurality of scanning focal length values corresponding to each of the visual angles to obtain the plurality of temporary images corresponding to each of the visual angles; and
a processing circuit, connected to the image pickup unit, wherein the processing circuit captures a temporary focal length value by weighing each of the scanning focal length values of the plurality of temporary images of each of the visual angles, and obtaining a weighting focal length value by a function and the a temporary focal length value to control the image pickup unit to perform a panorama image capturing process according to the weighting focal length value, wherein the function is in accordance with following expression:

$$L_W = \sum_{i=1}^{m} L_i \frac{Q_i}{Q_{tot}}$$

in which $L_W$ is the weighting focal length value; $L_i$ is the temporary focal length value corresponding to each of the visual angles; m is a number of the visual angles; $Q_i$ is quantity of temporary images corresponding to each of the visual angles; and $Q_{tot}$ is quantity of the total temporary images.

12. The image capture device of claim 11, wherein the temporary focal length value is the scanning focal length value of the temporary image with the best contrast or sharpness among the plurality of temporary images corresponding to the visual angle.

13. The image capture device of claim 11, wherein the temporary focal length value is an average scanning focal length value of the plurality of temporary images corresponding to the visual angle, an average value of a maximum scanning focal length value and a minimum scanning focal length value, or a difference between the maximum scanning focal length value and the minimum scanning focal length value.

14. The image capture device of claim 11, further comprising an image synthesis unit connected to the processing circuit, and the processing circuit controlling the image pickup unit to perform the panorama image capturing process according to the weighting focal length value to obtain a weighting image of each of the visual angles, and the image synthesis unit synthesizing the weighting image of each of the visual angles to obtain a panorama image.

15. The image capture device of claim 14, wherein the image synthesis unit intercepts a vertical image at a middle section of each of the weighting images and connects the vertical images to synthesize the panorama image.

* * * * *